United States Patent
Khan et al.

(10) Patent No.: US 11,246,019 B2
(45) Date of Patent: Feb. 8, 2022

(54) SYSTEMS AND METHODS FOR COMMUNICATION AND SHARING AMONGST GROUPS OF VEHICLES

(71) Applicants: Saniyal A Khan, Southfield, MI (US); Lei Zhang, Rochester Hills, MI (US); Lyle Baumgarten, Grosse Pointe Farms, MI (US); Matthew J Mazurek, Auburn Hills, MI (US); Michael J Minewiser, Beverly Hills, MI (US)

(72) Inventors: Saniyal A Khan, Southfield, MI (US); Lei Zhang, Rochester Hills, MI (US); Lyle Baumgarten, Grosse Pointe Farms, MI (US); Matthew J Mazurek, Auburn Hills, MI (US); Michael J Minewiser, Beverly Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/883,089

(22) Filed: May 26, 2020

(65) Prior Publication Data

US 2020/0382923 A1    Dec. 3, 2020

Related U.S. Application Data (60) Provisional application No. 62/853,358, filed on May 28, 2019.

(51) Int. Cl.
*H04W 4/40* (2018.01)
*H04W 4/029* (2018.01)
(Continued)

(52) U.S. Cl.
CPC .............. *H04W 4/40* (2018.02); *G07C 5/008* (2013.01); *G10L 25/48* (2013.01); *H04N 5/91* (2013.01);
(Continued)

(58) Field of Classification Search
CPC ....... H04W 4/40; H04W 4/029; H04W 4/021; H04W 4/08; H04W 36/14; H04W 88/06; G07C 5/008; G10L 25/48; H04N 5/91
See application file for complete search history.

(56) References Cited

U.S. PATENT DOCUMENTS

| 5,287,541 A * | 2/1994 | Davis ................. H04W 84/022 455/427 |
| 5,388,147 A * | 2/1995 | Grimes ................ G08B 25/016 455/404.2 |

(Continued)

FOREIGN PATENT DOCUMENTS

WO     2014200414 A1    12/2014

OTHER PUBLICATIONS

International Search Report and Written Opinion dated Oct. 6, 2020 for International Application No. PCT/US2020/034622, International Filing Date May 27, 2020.

*Primary Examiner* — Dominic E Rego
(74) *Attorney, Agent, or Firm* — Ralph E. Smith (57) ABSTRACT

Techniques for controlling communication amongst a group of vehicles include determining whether a cellular network is unavailable or a user input indicative of a switchover request has been received, when the cellular network is available, controlling a cellular network transceiver to share information between the vehicle and one or more other vehicles of the group of vehicles via the cellular network, and when the cellular network is unavailable or in response to receiving the user input indicative of the switchover request, controlling a low Earth orbit (LEO) satellite network transceiver to share information between the vehicle and the one or more other vehicles of the group of vehicles via an LEO satellite network and not via the cellular network.

20 Claims, 8 Drawing Sheets

(51) Int. Cl.
*H04W 4/021* (2018.01)
*H04W 4/08* (2009.01)
*G07C 5/00* (2006.01)
*G10L 25/48* (2013.01)
*H04N 5/91* (2006.01)
*H04W 36/14* (2009.01)
*H04W 88/06* (2009.01)

(52) U.S. Cl.
CPC ........... *H04W 4/021* (2013.01); *H04W 4/029* (2018.02); *H04W 4/08* (2013.01); *H04W 36/14* (2013.01); *H04W 88/06* (2013.01)

(56) References Cited

U.S. PATENT DOCUMENTS

| | | | |
|---|---|---|---|
| 6,556,828 | B1 | 4/2003 | Carlin et al. |
| 7,579,987 | B2 | 8/2009 | Cohen et al. |
| 7,663,541 | B2 | 2/2010 | Klinghult et al. |
| 8,305,936 | B2 | 11/2012 | Wang |
| 9,141,112 | B1 | 9/2015 | Loo et al. |
| 9,324,201 | B2 * | 4/2016 | Jun ................... G07C 5/0866 |
| 9,947,147 | B1 * | 4/2018 | Kwak ................. G07C 5/085 |
| 10,091,299 | B2 | 10/2018 | Mian et al. |
| 10,820,292 | B1 * | 10/2020 | Peter .................. H04W 56/004 |
| 2005/0055407 | A1 | 3/2005 | Tandler et al. |
| 2005/0099984 | A1 * | 5/2005 | Alakoye ............. H04M 7/0039 370/338 |
| 2006/0109107 | A1 * | 5/2006 | Staton .................. B60R 25/00 340/539.13 |
| 2007/0027614 | A1 | 2/2007 | Reeser et al. |
| 2007/0195808 | A1 | 8/2007 | Ehrlich et al. |
| 2008/0229369 | A1 * | 9/2008 | Lewis ................. H04N 7/17318 725/78 |
| 2009/0296605 | A1 * | 12/2009 | Lewis .................... H04L 67/16 370/259 |
| 2010/0225975 | A1 * | 9/2010 | Silverbrook ......... B41J 2/17513 358/3.28 |
| 2013/0139140 | A1 | 5/2013 | Rao et al. |
| 2013/0321466 | A1 * | 12/2013 | Kocienda ............... G01C 21/26 345/635 |
| 2014/0302774 | A1 | 10/2014 | Burke et al. |
| 2015/0011220 | A1 * | 1/2015 | Buckle ................. H04W 36/18 455/436 |
| 2015/0024677 | A1 | 1/2015 | Gopal et al. |
| 2016/0294984 | A1 * | 10/2016 | Hamano ................ B60L 53/63 |
| 2017/0238216 | A1 * | 8/2017 | Damnjanovic .... H04B 7/18541 455/427 |
| 2018/0048850 | A1 * | 2/2018 | Bostick ................. H04N 7/188 |
| 2020/0175865 | A1 * | 6/2020 | Han ..................... H04W 4/021 |
| 2020/0245210 | A1 * | 7/2020 | Fotheringham ....... H04W 12/08 |
| 2020/0264634 | A1 * | 8/2020 | Hadi ................... B60W 60/005 |

* cited by examiner

SYSTEMS AND METHODS FOR COMMUNICATION AND SHARING AMONGST GROUPS OF VEHICLES

CROSS-REFERENCE TO RELATED APPLICATION(S)

This application claims the benefit of U.S. Provisional Application No. 62/853,358, filed on May 28, 2019. The disclosure of this application is incorporated herein by reference in its entirety.

FIELD

The present application generally relates to vehicle-to-vehicle communication and, more particularly, to systems and methods for communication and sharing amongst groups of vehicles.

BACKGROUND

Existing vehicles offer a relatively limited social experience during driving. As a result, vehicle drivers and passengers typically utilize a variety of mobile applications to stay connected to other friends and family, some of which could be driving or riding in other nearby vehicles as part of a caravan (e.g., off-roading). Different mobile applications could be used, for example, for each of maps/navigation, voice calls, video calls, obstacle reporting, music playback/sharing, and the like. Switching between these various mobile applications is a cumbersome process, and these mobile applications are also typically installed on separate mobile phones or tablet computers, which results in the vehicle drivers and passengers being somewhat disconnected from the actual vehicles and the overall driving experience. Some vehicle-specific features, such as images or video captured by exterior camera systems, may also not be easily sharable with others. In addition, communication amongst vehicles may be difficult or impossible in remote areas where conventional networks (e.g., cellular networks) are unavailable. Accordingly, while such vehicle communication systems work well for their intended purpose, there remains a need for improvement in the relevant art.

SUMMARY

According to one example aspect of the invention, a communication system for a vehicle is presented. In one exemplary implementation, the communication system comprises: a cellular network transceiver configured for communication via a cellular network, a low Earth orbit (LEO) satellite network transceiver configured for communication via an LEO satellite network, and a controller configured to: when the cellular network is available, control the cellular network transceiver to share information between the vehicle and one or more other vehicles of a group of vehicles via the cellular network, and when the cellular network is unavailable or in response to detecting a user input indicative of a switchover request, control the LEO satellite network transceiver to share information between the vehicle and the one or more other vehicles of the group of vehicles via the LEO satellite network and not via the cellular network.

In some implementations, the controller is further configured to detect the user input indicative of the switchover request, and only in response to detecting the user input, control the LEO satellite network transceiver to share information between the vehicle and the one or more other vehicles of the group of vehicles via the LEO satellite network and not via the cellular network.

In some implementations, the controller is further configured to detect a dropout condition of the cellular network, and only in response to detecting the dropout condition, control the LEO satellite network transceiver to share information between the vehicle and the one or more other vehicles of the group of vehicles via the LEO satellite network and not via the cellular network.

In some implementations, the controller is further configured to establish a leader mode where a particular vehicle of the group of vehicles opts-in to be a leader vehicle, wherein the information shared amongst the group of vehicles is leader information relative to the leader vehicle. In some implementations, the leader information comprises global positioning system (GPS) coordinate based information for each particular vehicle of the group of vehicles relative to the leader vehicle.

In some implementations, the controller is further configured to receive a pin annotation identifying a point-of-interest (POI) at a particular set of GPS coordinates, upload the pin annotation to a secure network via the cellular or LEO satellite networks, and sharing the pin annotation with the one or more other vehicles of the group of vehicles via the secure network.

In some implementations, the controller is further configured to receive at least one of a voice recording annotation and a camera recording annotation at a particular set of GPS coordinates, upload the at least one of the voice recording annotation and the camera recording annotation to a secure network via the cellular or LEO satellite networks, and sharing the at least one of the voice recording annotation and the camera recording annotation with the one or more other vehicles of the group of vehicles via the secure network.

In some implementations, the information shared amongst the group of vehicles via the LEO satellite network comprises at least one of voice recordings and camera recordings.

In some implementations, the controller is further configured to determine a current set of suspension settings of the vehicle, and in response to detecting that the vehicle is opted-in to share its current set of suspension settings: upload the current set of suspension settings for the vehicle to a secure network via the cellular or LEO satellite networks, and sharing the current set of suspension settings of the vehicle with the one or more other vehicles of the group of vehicles via the secure network.

In some implementations, the group of vehicles comprises ten or more vehicles.

According to another example aspect of the invention, a method of controlling communication amongst a group of vehicles is presented. In one exemplary implementation, the method comprises: determining, by a controller of a vehicle of the group of vehicles, whether a cellular network is unavailable or a user input indicative of a switchover request has been received, wherein the vehicle comprises both a cellular network transceiver configured to communicate via the cellular network and an LEO satellite network transceiver configured to communicate via an LEO satellite network, when the cellular network is available, controlling, by the controller, the cellular network transceiver to share information between the vehicle and one or more other vehicles of the group of vehicles via the cellular network, and when the cellular network is unavailable or in response to receiving the user input indicative of the switchover request, controlling, by the controller, the LEO satellite network transceiver to share information between the vehicle and the one or more other vehicles of the group of vehicles via the LEO satellite network and not via the cellular network.

In some implementations, the method further comprises: detecting, by the controller, the user input indicative of the switchover request, and only in response to detecting the user input, controlling, by the controller, the LEO satellite network transceiver to share information between the vehicle and the one or more other vehicles of the group of vehicles via the LEO satellite network and not via the cellular network.

In some implementations, the method further comprises: detecting, by the controller, a dropout condition of the cellular network, and only in response to detecting the dropout condition, controlling, by the controller, the LEO satellite network transceiver to share information between the vehicle and the one or more other vehicles of the group of vehicles via the LEO satellite network and not via the cellular network.

In some implementations, further comprising establishing, by the controller, a leader mode where a particular vehicle of the group of vehicles opts-in to be a leader vehicle, wherein the information shared amongst the group of vehicles is leader information relative to the leader vehicle. In some implementations, the leader information comprises global positioning system (GPS) coordinate based information for each particular vehicle of the group of vehicles relative to the leader vehicle.

In some implementations, the method further comprises receiving, by the controller, a pin annotation identifying a point-of-interest (POI) at a particular set of GPS coordinates, uploading, by the controller, the pin annotation to a secure network via the cellular or LEO satellite networks, and sharing, by the controller, the pin annotation with the one or more other vehicles of the group of vehicles via the secure network.

In some implementations, the method further comprises: receiving, by the controller, at least one of a voice recording annotation and a camera recording annotation at a particular set of GPS coordinates, uploading, by the controller, the at least one of the voice recording annotation and the camera recording annotation to a secure network via the cellular or LEO satellite networks, and sharing, by the controller, the at least one of the voice recording annotation and the camera recording annotation with the one or more other vehicles of the group of vehicles via the secure network.

In some implementations, the information shared amongst the group of vehicles via the LEO satellite network comprises at least one of voice recordings and camera recordings.

In some implementations, the method further comprises determining, by the controller, a current set of suspension settings of the vehicle, and in response to detecting that the vehicle is opted-in to share its current set of suspension settings: uploading, by the controller, the current set of suspension settings for the vehicle to a secure network via the cellular or LEO satellite networks, and sharing, by the controller, the current set of suspension settings of the vehicle with the one or more other vehicles of the group of vehicles via the secure network.

In some implementations, the group of vehicles comprises ten or more vehicles.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there remains a need for improvement in the art of vehicle communication systems and methods, particularly those that provide an improved social experience while also being able to function in remote areas where conventional networks (e.g., cellular networks) are limited or unavailable. Accordingly, improved vehicle communication systems and methods for information sharing amongst a group of vehicles is presented. These systems and methods utilize a low Earth orbit (LEO) satellite network for vehicle information sharing in remote areas where a cellular network is limited or unavailable. LEO satellites orbit the Earth at an altitude of 2000 kilometers (km) or less, which is substantially lower than conventional geosynchronous equatorial orbit (GEO) satellites and medium Earth orbit (MEO) satellites (e.g., global positioning system, or GPS satellites), which orbit at much higher altitudes of up to 35,000 km.

The lower orbital altitude of LEO satellites provides for lower latency (i.e., less delayed) transmission, while their reduced or limited coverage area is also more than sufficient for information sharing amongst a group of caravanning (e.g., off-roading) vehicles. An LEO satellite network is also capable of handling communication and sharing amongst relatively large groups of vehicles (e.g., more than ten or twenty vehicles). For example only, such larger groups of vehicles could participate in group off-roading events. Other communication methods, such as dynamic mesh networking via short-range wireless communication, may only be operable for relatively small groups of vehicles (e.g., 2-4 vehicles). Non-limiting examples of information sharing using such a system include a leader mode with GPS coordinate based information relative to a leader vehicle, point-of-interest (POI) pin annotations, voice and/or camera recording annotations and sharing, and suspension settings sharing.

Figure 1A:
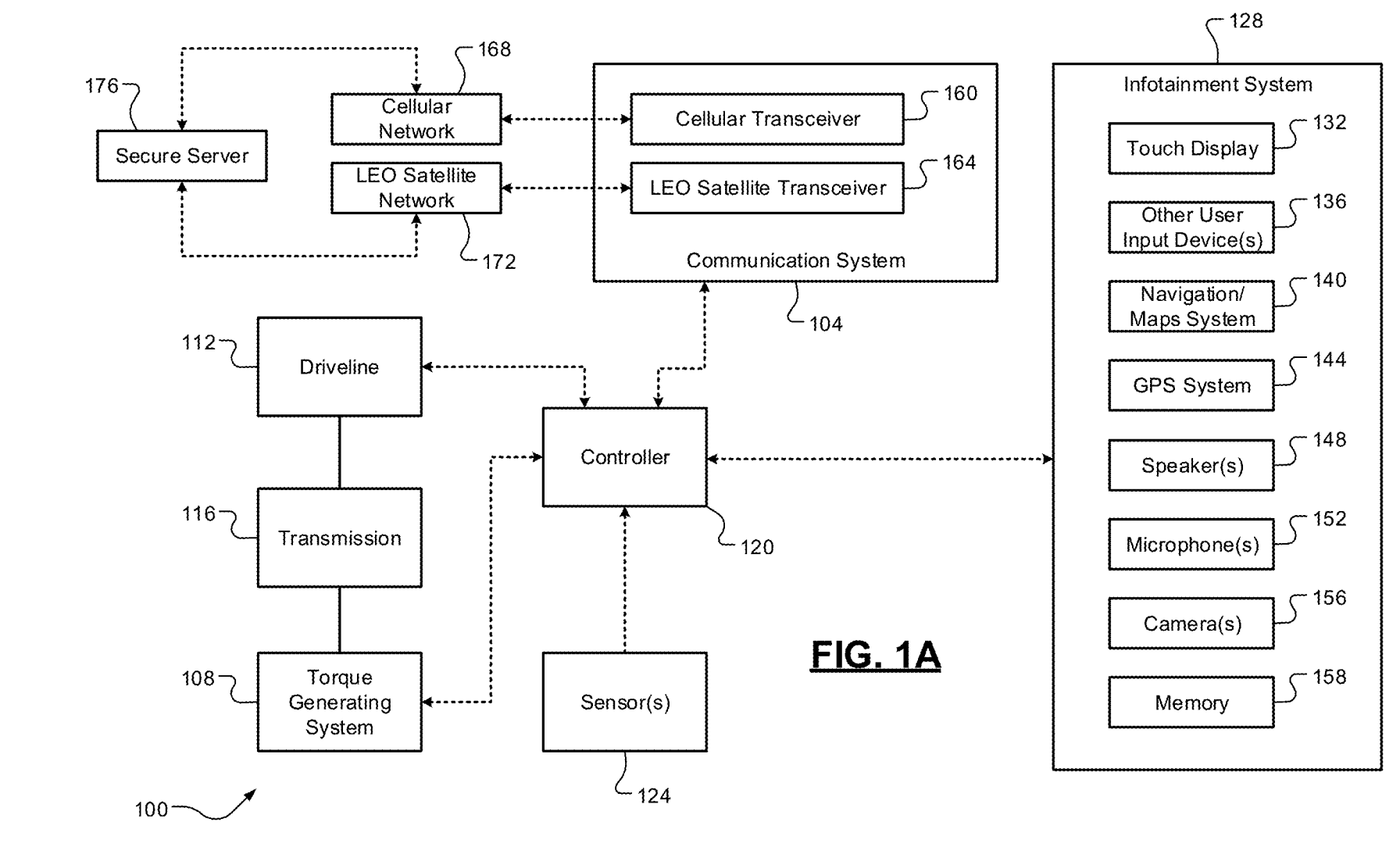
FIG. 1A is a functional block diagram of an example vehicle having a communication system configured for information sharing amongst a group of vehicles via both a cellular network and a low Earth orbit (LEO) satellite network according to the principles of the present disclosure.

Referring now to FIG. 1A, a functional block diagram of an example vehicle 100 having an example communication system 104 according to the principles of the present disclosure is illustrated. The vehicle 100 comprises a torque generating system 108 (e.g., an engine, an electric motor, or a combination thereof) that generates drive torque, which is transferred to a driveline 112 via transmission 116 to propel the vehicle 100. The driveline 112 comprises a set of suspension components (axles, differentials, transfer cases, etc.) configured to distribute the drive torque from the transmission 116 to wheels/tires of the driveline 112. A controller 120 controls operation of the vehicle 100, e.g., based on input(s) from a set of one or more sensors 124.

In one exemplary implementation, the vehicle 100 comprises an infotainment system 128 comprising at least one of a touch display 132 configured to display information to (e.g., the user interfaces of FIGS. 2A, 3A, and 4A) and receive touch input from user(s), other user input device(s) 136 (e.g., steering wheel controls), a navigation/maps system 140, a GPS system 144, a set of one or more speakers 148, a set of one or more microphones 152, a set of one or more cameras 156, and a memory 158. It will be appreciated that the infotainment system 128 could comprise additional components that are not illustrated and/or that some of the components illustrated as being part of the infotainment system 128 could be combined or could be separate systems that are merely in communication with the infotainment system 128, e.g., via a localized network, such as a controller area network (CAN).

The communication system 104 comprises both a cellular network transceiver 160 and an LEO satellite network transceiver 164. It will be appreciated that these transceivers 160, 164 could be integrated into the vehicle 100 (e.g., as part of the infotainment unit 128) or could be separate or standalone devices, such as an LEO satellite network hotspot device. The cellular network transceiver 160 is configured to communicate via a cellular network 168. The LEO satellite network transceiver 164 is configured to communicate via an LEO satellite network 172. Using one of these network connections, the vehicle 100 is able to access a secure server or network 176. The terms "secure server" and "secure network" as used herein refers to one or more remote servers that is/are only accessible to authorized users, such as a particular type or brand of vehicle.

Figure 1B:
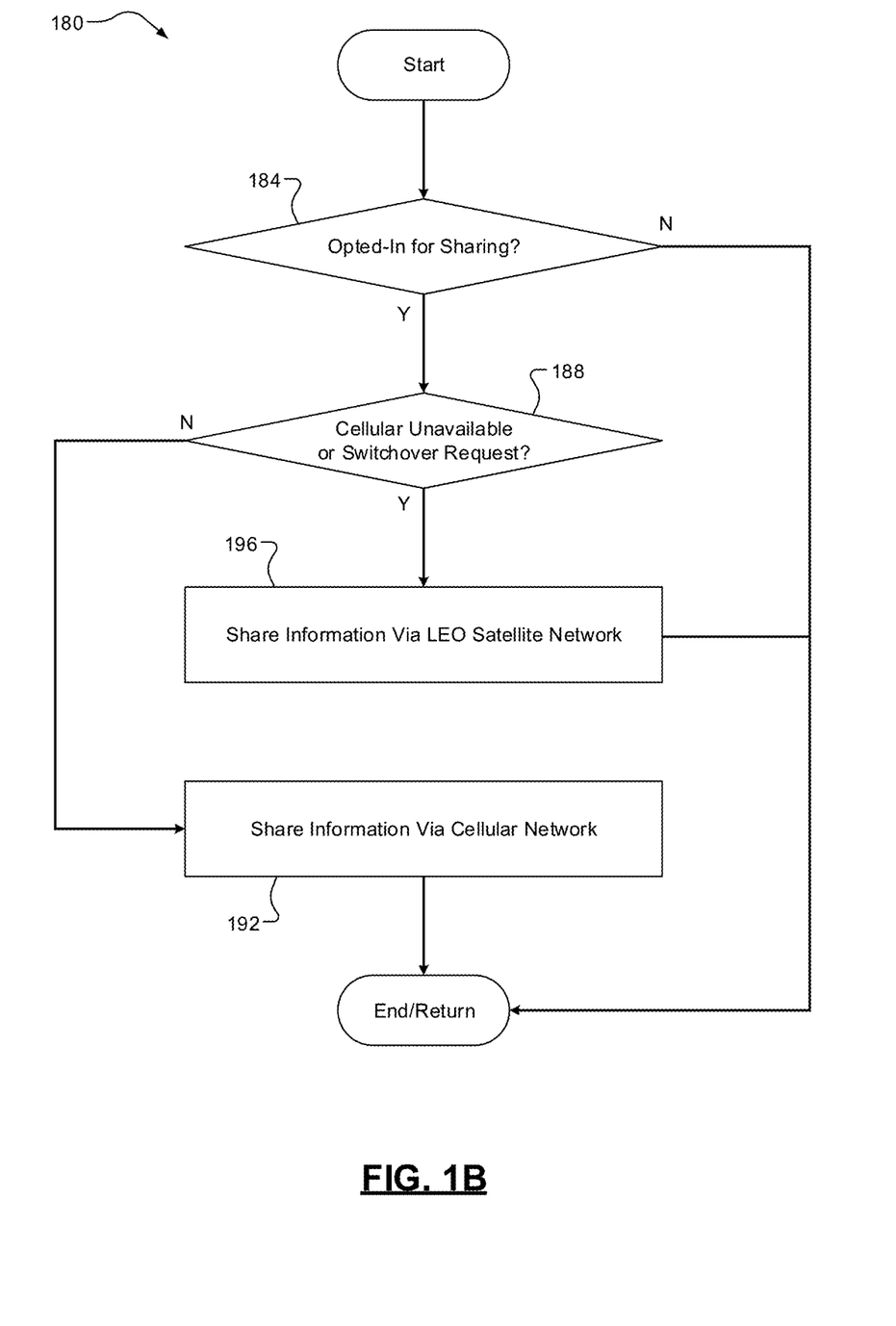
FIG. 1B is a flow diagram of a method of controlling information sharing amongst a group of vehicles via both a cellular network and an LEO satellite network according to the principles of the present disclosure.

Referring now to FIG. 1B and with continued reference to FIG. 1A, a method 180 of controlling information sharing amongst a group of vehicles via both the cellular network 168 and the LEO satellite network 172 according to the principles of the present disclosure is illustrated. For purposes of this disclosure, the above-mentioned group of vehicles comprises the vehicle 100, but it will be appreciated that the systems and methods of the present disclosure could be applicable to any groups of vehicles. At 184, the controller 120 determines whether a user of the vehicle 100 has opted-in for information sharing amongst the other vehicles of the group of vehicles. When true, the method 180 proceeds to 188. Otherwise, the method 180 ends or returns to 184. At 188, the controller 188 determines whether the cellular network 168 is unavailable or whether a switchover request is detected or received. When false, the method 180 proceeds to 196 where the controller 120 continues to utilize the cellular network 168 for information sharing and the method 180 ends or returns to 184.

This switchover request could be, for example, a manual input from the user of the vehicle 100 to switch to LEO satellite network communication. For example, once the vehicle 100 starts heading into a remote area where cellular network coverage could be limited, the user could manually input this switchover request (e.g., via the touch display 132 or the other input device(s) 136). Alternatively, this switchover operation could be handled by the controller 120 automatically. For example, if the signal strength of the cellular network 168 drops below a threshold value (e.g., a "dropout condition"), the controller 120 could automatically switchover to using the LEO satellite network 172 for information sharing. When true, the method 180 proceeds to 196 where the controller 120 switches to utilizing the LEO satellite network 172 for information sharing and not the cellular network 168. The method 180 then ends or returns to 184. Similarly, a switchback to utilizing the cellular network could be performed automatically at any time as the cellular network 168 may provide superior network performance compared to the LEO satellite network 172. Switching back/forth too often, however, may be undesirable to prevent communication dropouts (e.g., packet losses).

While communication via one of the cellular network 168 and the LEO satellite network 172 is often described herein, it will be appreciated that there could be instances where vehicles are in communication or otherwise sharing information with each other using different networks. For example, one vehicle of the group of vehicles may not have switched over to the LEO satellite network 172 or may still have a strong signal with the cellular network 168 and thus that vehicle may be communicating/sharing information via the cellular network 168 whereas other vehicle(s) of the group of vehicles may be communicating/sharing information via the LEO satellite network 172. This could be particularly true when the group of vehicles are more spaced out and thus each vehicle's network strength could widely vary.

Figure 2A:
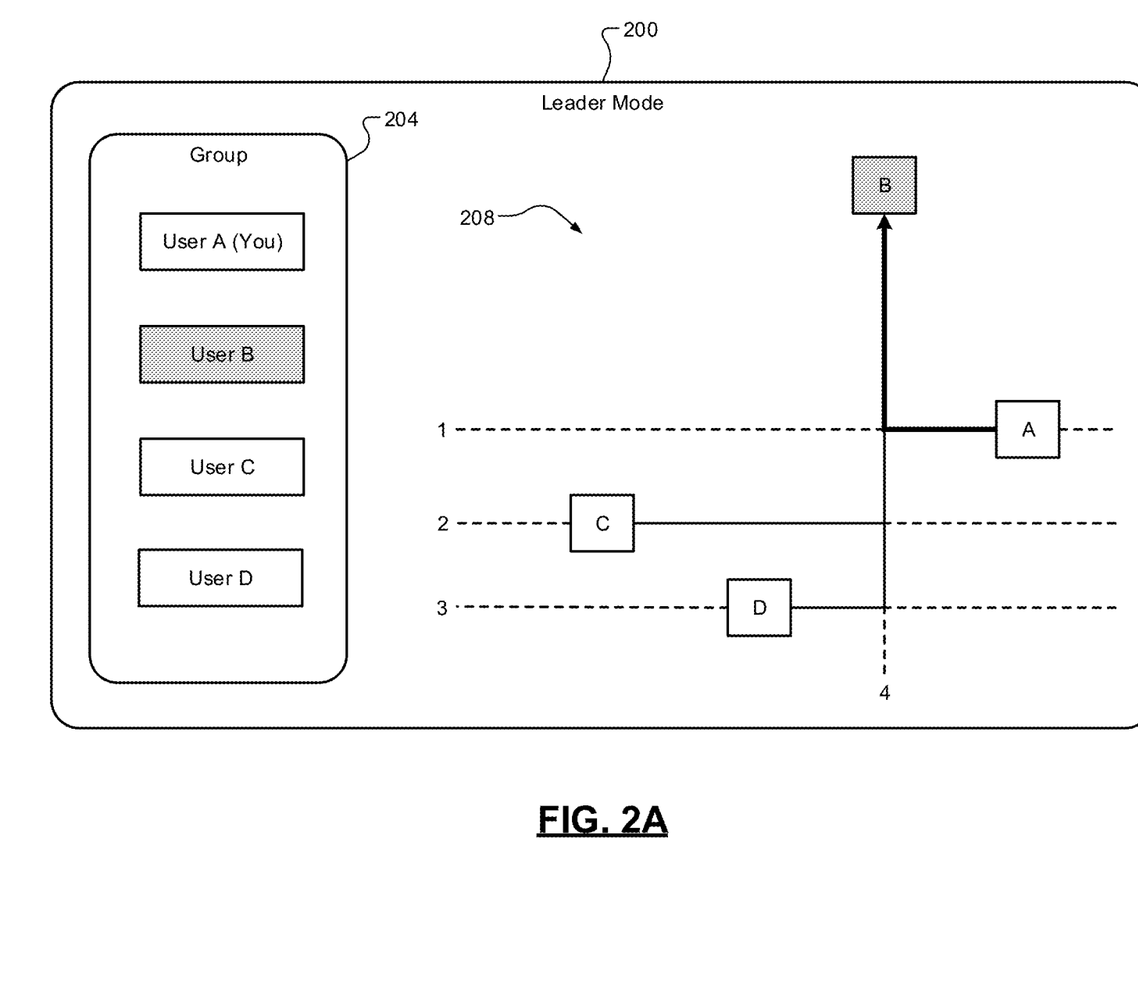
FIGS. 2A-2B are an example user interface and an example method, respectively, for a leader mode for a group of vehicles according to the principles of the present disclosure.
Figure 2B:
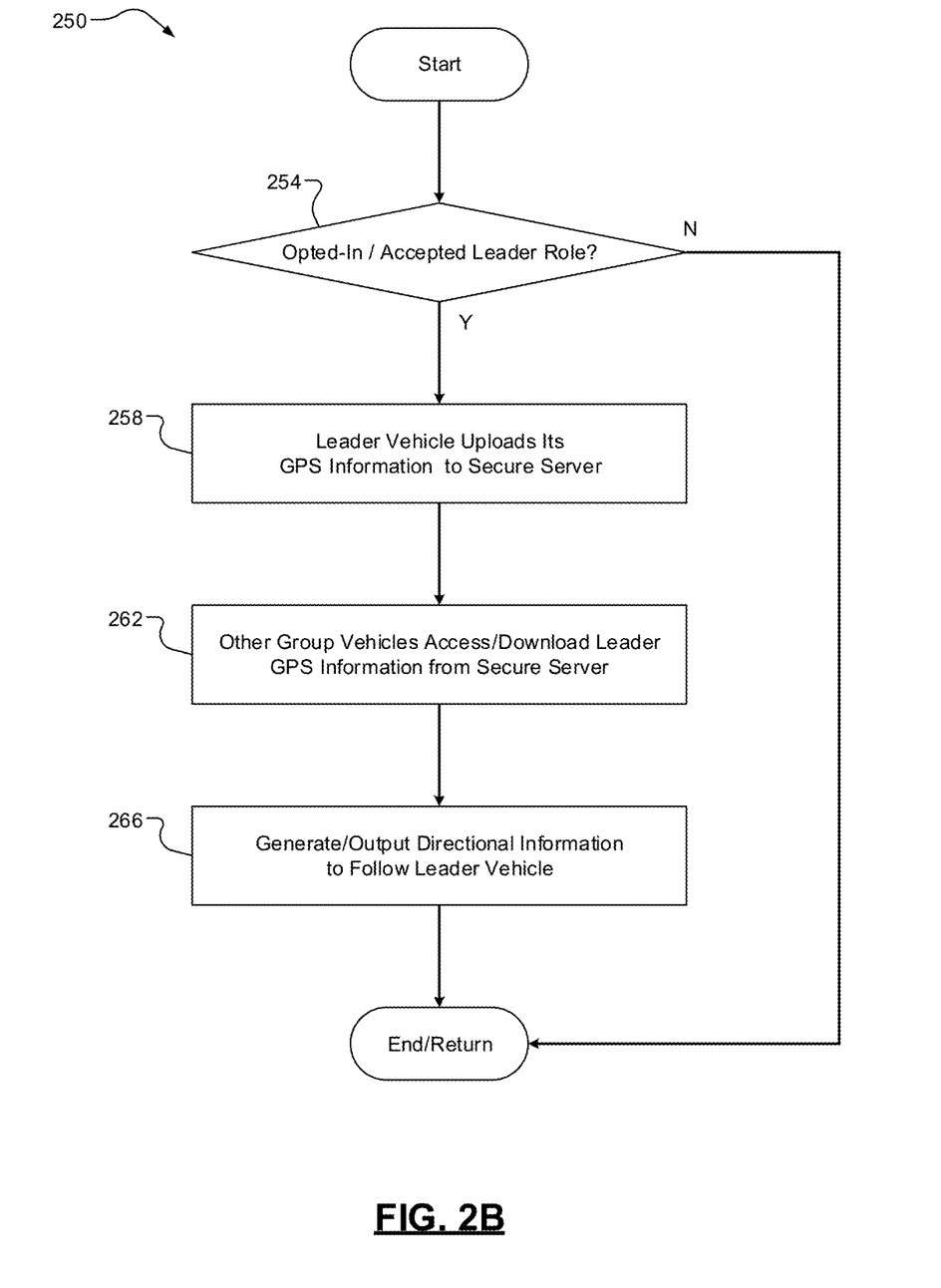

Referring now to FIGS. 2A-2B, an example user interface 200 and an example method 250, respectively, for a leader mode for a group of vehicles according to the principles of the present disclosure are illustrated. In FIG. 2A, the user interface 200 for the leader mode illustrates a group area 204 where icons for each vehicle of the group of vehicles are shown. User A is indicated to be vehicle 100, and User B is highlighted as the leader vehicle. This group of vehicles could have been previously formed (e.g., at a start of or prior to the trip). For example, this group could be a saved group because these vehicles (Users A-D) often travel together. In the method 250 of FIG. 2B, User B has opted-in or accepted the leader role at 254. If User B had not opted-in or accepted the leader role, then method 250 would have ended or returned to 250. At 258, the leader vehicle (User B) uploads its GPS information to the secure server 176 using one of the cellular network 168 and the LEO satellite network 172.

At 262, other vehicles (Users A, C, and D) access or download the leader vehicle (User B) GPS information from the secure server 176. At 266, each of the other vehicles then generates or outputs directional information (e.g., turn-by-turn instructions) for each vehicle to follow the leader vehicle (User B). This process will continue while User B remains the leader vehicle and his/her vehicle's position continues to change (e.g., return to 254). In FIG. 2A, a map area 208 of the user interface 200 illustrates the leader vehicle (User B) location relative to the other vehicles. As shown, vehicle 100 (User A) is instructed to travel down road 1 and then make a right turn onto road 4 to follow the leader vehicle (User B). Similarly, vehicles for Users C and D will be provided instructions to travel down roads 2 and 3, respectively, and make left turns onto road 4 to follow the leader vehicle (User B).

Figure 3A:
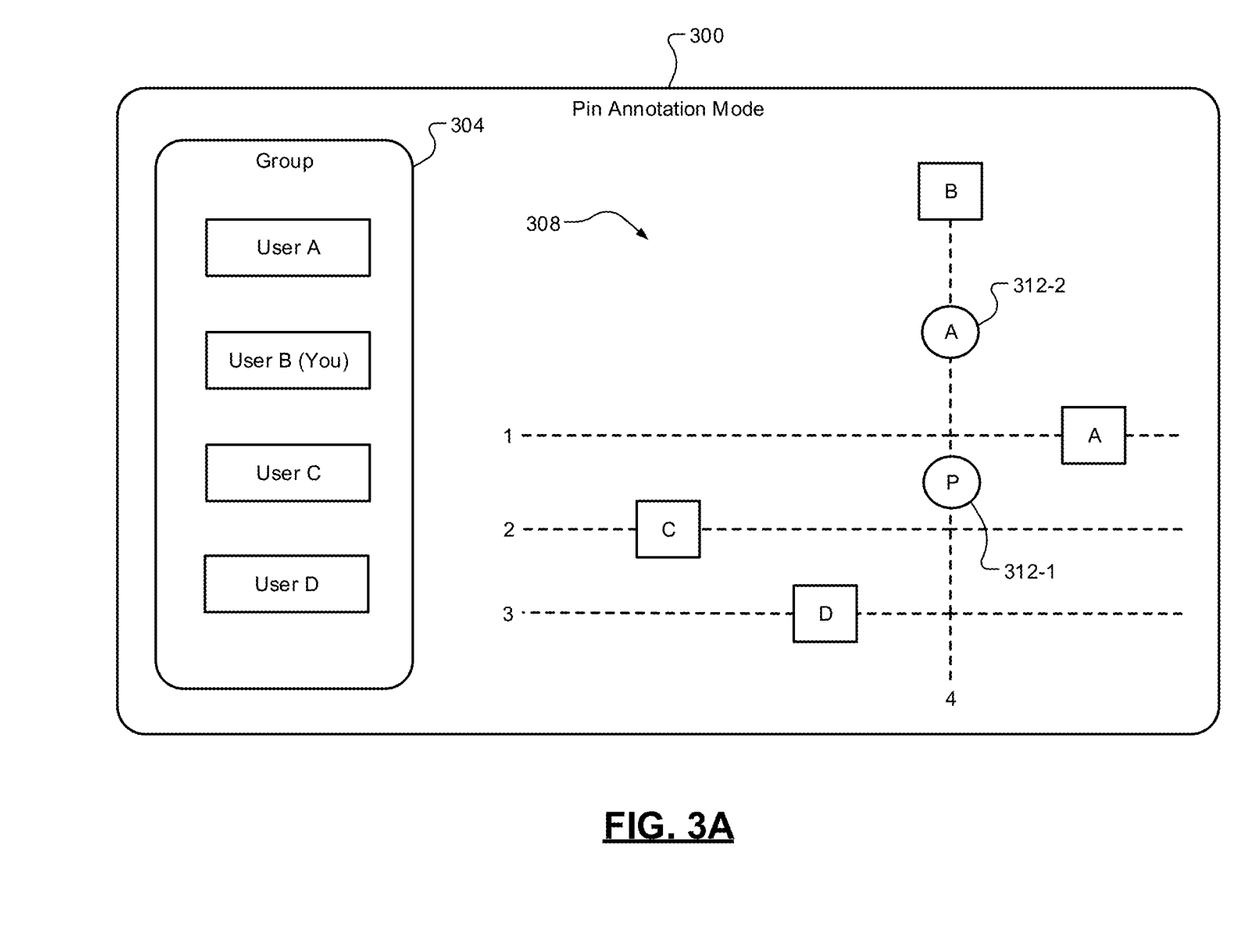
FIGS. 3A-3B are an example user interface and an example method, respectively, for map annotating for a group of vehicles according to the principles of the present disclosure.
Figure 3B:
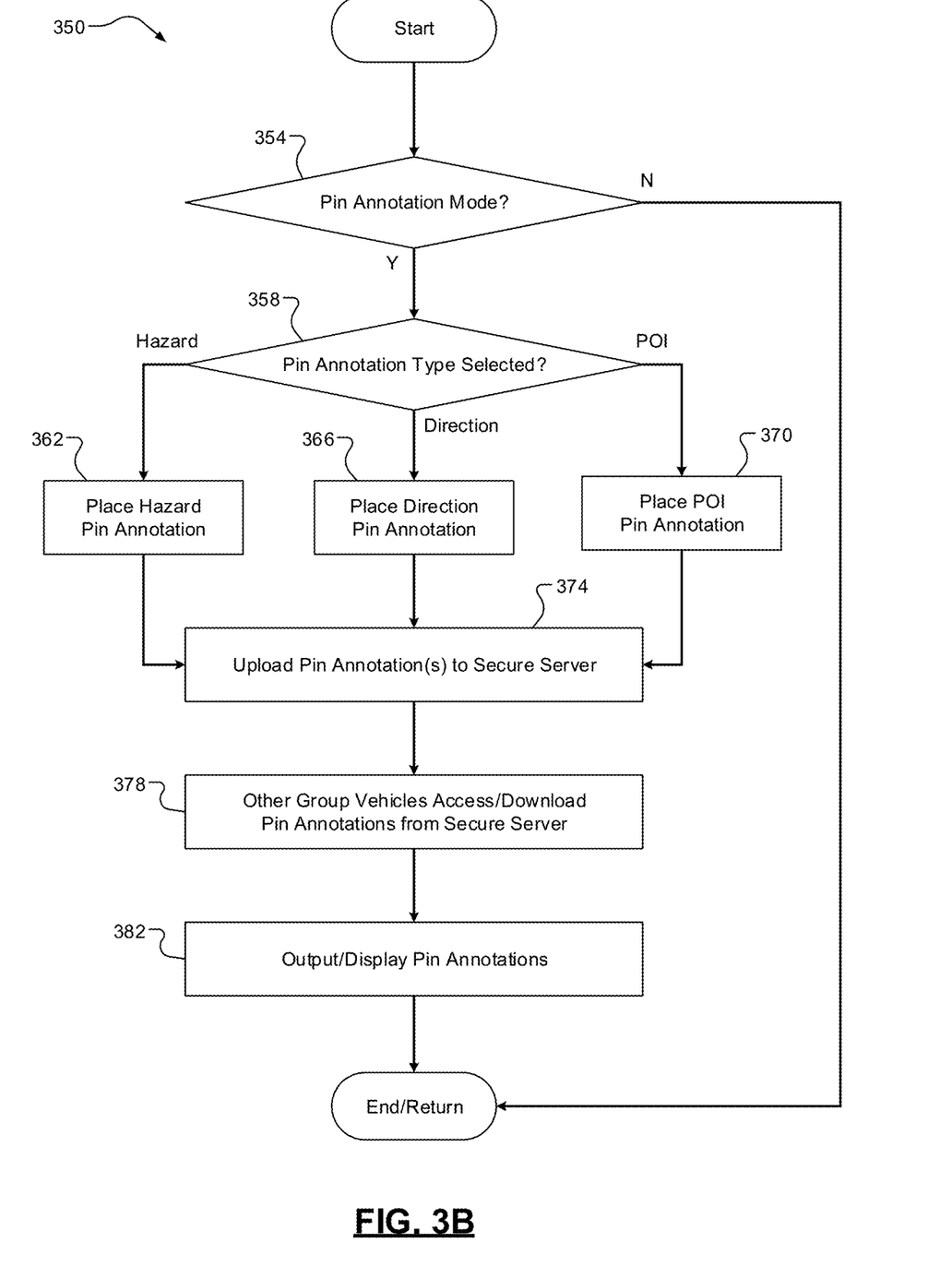

Referring now to FIGS. 3A-3B, an example user interface 300 and an example method 350, respectively, for map pin annotating for a group of vehicles according to the principles of the present disclosure are illustrated. As shown in the group area 304 of the user interface, User B corresponds to vehicle 100 and Users A, C, and D correspond to other vehicles of the group of vehicles. In the method 350 of FIG. 3B, the controller 120 of vehicle 100 determines whether User B has opted-in or accessed a pin annotation mode to bring up user interface 300. When false, the method 350 ends or returns to 354. At 358, the controller 120 determines which pin annotation type has been selected. Non-limiting examples of pin annotation types include hazards (accidents, physical obstacles, etc.), directions (e.g., make a turn at an unmarked road), and POIs (restaurants, gas stations, police cars, etc.). Physical obstacles, for example, could include potholes, road closures, and off-roading obstacles such as rocks, mountains, rivers, and the like. At 362, 366, or 372, the controller 120 places the selected pin annotation type at a GPS location specified by User B (e.g., via a touch input on the map area 308). As shown, User B has placed a police car POI pin annotation 312-1 and an accident hazard pin annotation 312-2 along road 4. At 378, the pin annotation(s) (and corresponding GPS locations) are uploaded to the secure server 176, where they are then accessible/downloadable for display by other vehicles of the group of vehicles at 382. The method 350 then ends or returns to 354.

Figure 4A:
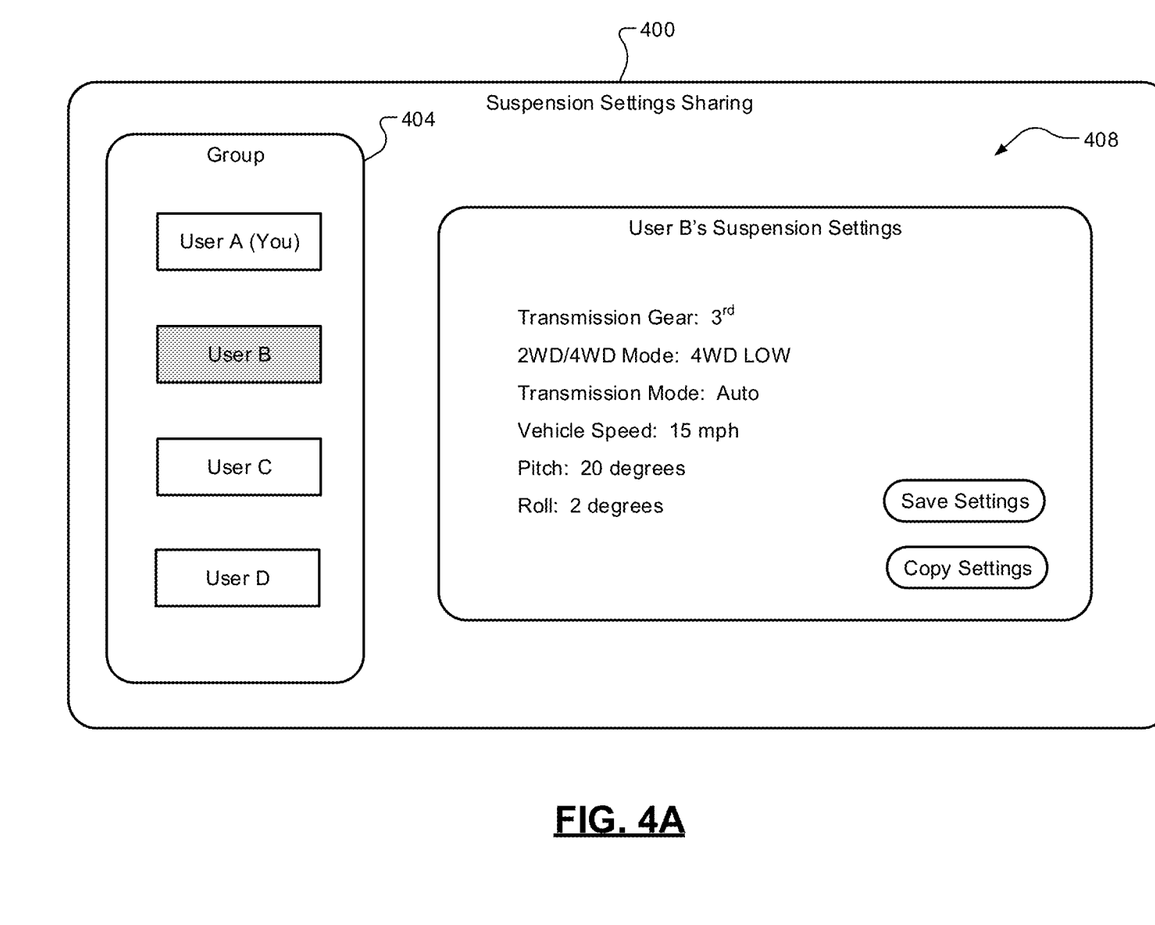
FIGS. 4A-4B are an example user interface and an example method, respectively, for suspension settings sharing for a group of vehicles according to the principles of the present disclosure.
Figure 4B:
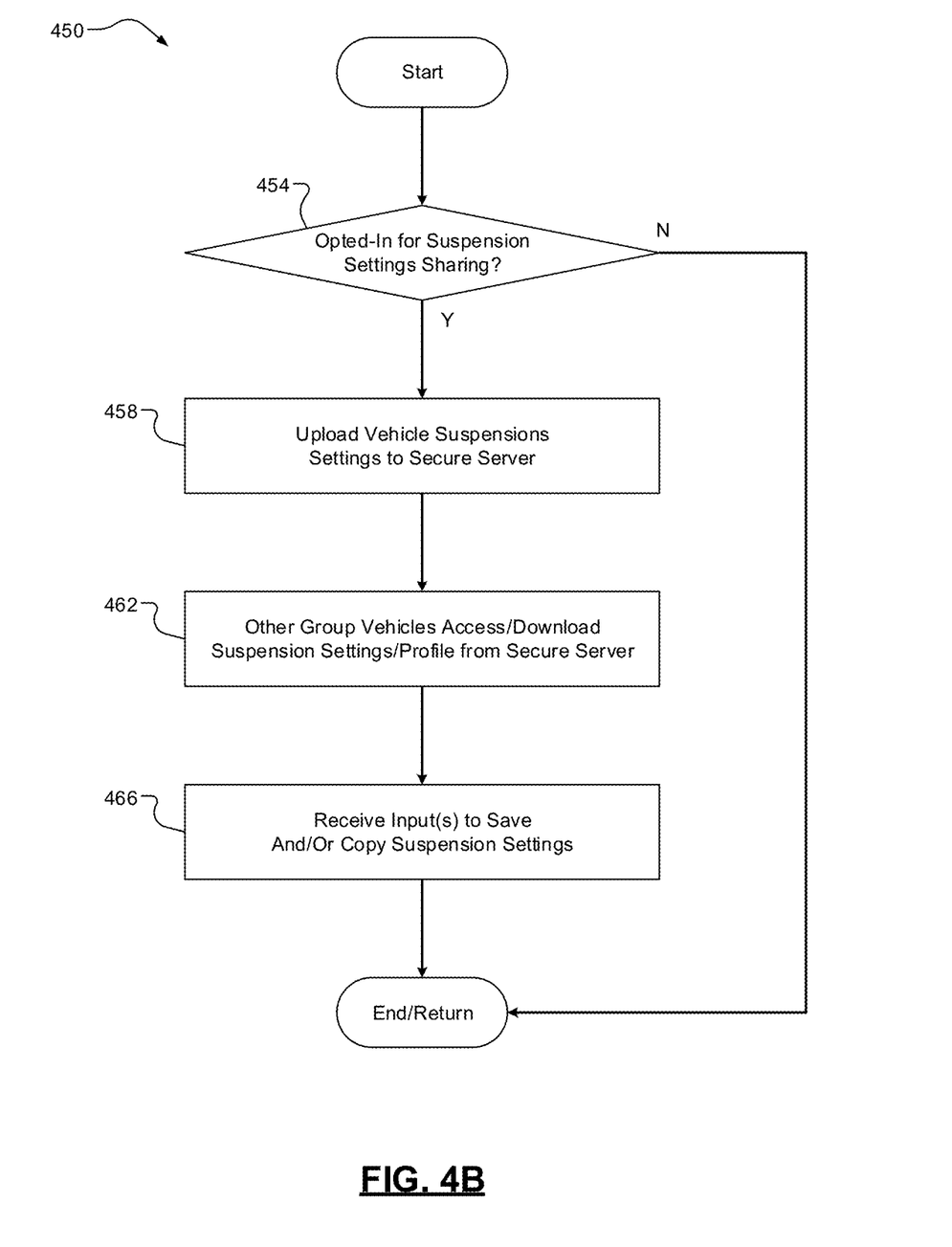

Referring now to FIGS. 4A-4B, an example user interface 400 and an example method 450, respectively, for suspension settings sharing for a group of vehicles according to the principles of the present disclosure are illustrated. In FIG. 4A, the user interface 400 for the suspension settings sharing illustrates a group area 404 where icons for each vehicle of the group of vehicles are shown. User A is indicated to be vehicle 100, and User B is highlighted as the vehicle for which User A wants to view the corresponding vehicle suspensions settings. In FIG. 4B, this would be if User B has opted-in for suspensions settings sharing at 454. If User B had not opted-in to suspension settings sharing, then the suspensions settings area 408 of user interface 400 would be blank or otherwise unavailable. At 458, User B has opted-in to suspension settings sharing and their vehicle's suspension settings information is uploaded to the secure server 176, where it is then accessible/downloadable by other vehicles of the group of vehicles for viewing/display at 462.

As shown, the suspension settings for User B's vehicle indicate the transmission 116 being in $3^{rd}$ gear, the two-wheel drive/four-wheel drive (2WD/4WD) mode being set to 4WD low, the transmission 116 being in an automatic mode (e.g., as opposed to a manual or manumatic mode), the vehicle's speed being 15 miles per hour (mph), and the vehicle's pitch and roll being 20 degrees and 2 degrees, respectively. It will be appreciated that the term "suspensions settings" can comprise settings or parameters not directly tied to the vehicle's suspension (e.g., transmission settings) as shown. At optional 466, User A of vehicle 100 could select to save User B's suspension settings (e.g., to memory 158) and/or could select to copy User B's suspension settings, via the respective selectable icons of user interface 400. It will be appreciated that this copy feature could have safety preconditions, such as the vehicle 100 being stopped and the transmission 116 being in park. The method 450 then ends or returns to 454.

It will be appreciated that the communication system 104 of the present disclosure could also be extended to other types of information sharing and map annotating. For example, voice recording annotations and/or camera recording annotations could be made on the map and shared amongst the vehicles. For example only, vehicle 100 could record its driver's voice narrative as he/she navigates across a river, and in some cases, the camera(s) 156 of the vehicle 100 could simultaneously capture external video during the river crossing. The voice and/or camera recordings could be uploaded to the secure server 176 and associated with a particular GPS location and could then be retrieved and viewed/listened to by other vehicles of the group of vehicles (or any vehicles with access to the secure server 176) to help them navigate the river crossing in the future. Live voice and/or camera sharing could also be performed. For example only, in the leader mode the leader vehicle could continuously be uploading voice and/or camera feeds for access by other vehicles of the group of vehicles via the secure server 176. This sharing ability could provide for a much more engaged and social group driving experience.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:
1. A communication system for a vehicle, the communication system comprising:
 a cellular network transceiver configured for communication via a cellular network;
 a low Earth orbit (LEO) satellite network transceiver configured for communication via an LEO satellite network; and
 a controller configured to:
   when the cellular network is available, control the cellular network transceiver to share information between the vehicle and one or more other vehicles of a group of vehicles via the cellular network;
   when the cellular network is unavailable or in response to detecting a user input indicative of a switchover request, control the LEO satellite network transceiver to share information between the vehicle and the one or more other vehicles of the group of vehicles via the LEO satellite network and not via the cellular network;
   detect when one vehicle of the group of vehicles shares a current set of suspension settings via the cellular and/or LEO satellite networks; and
   in response to detecting a user input indicative of a request to copy the suspension settings, control sus- pension settings of the vehicle to copy the shared current set of suspension settings of the one vehicle of the group of vehicles.

2. The communication system of claim 1, wherein the controller is further configured to:
   detect the user input indicative of the switchover request; and
   only in response to detecting the user input, control the LEO satellite network transceiver to share information between the vehicle and the one or more other vehicles of the group of vehicles via the LEO satellite network and not via the cellular network.

3. The communication system of claim 1, wherein the controller is further configured to:
   detect a dropout condition of the cellular network; and
   only in response to detecting the dropout condition, control the LEO satellite network transceiver to share information between the vehicle and the one or more other vehicles of the group of vehicles via the LEO satellite network and not via the cellular network.

4. The communication system of claim 1, wherein the controller is further configured to establish a leader mode where a particular vehicle of the group of vehicles opts-in to be a leader vehicle, wherein the information shared amongst the group of vehicles is leader information relative to the leader vehicle.

5. The communication system of claim 4, wherein the leader information comprises global positioning system (GPS) coordinate based information for each particular vehicle of the group of vehicles relative to the leader vehicle.

6. The communication system of claim 1, wherein the controller is further configured to:
   receive a pin annotation identifying a point-of-interest (POI) at a particular set of global positioning system (GPS) coordinates;
   upload the pin annotation to a secure network via the cellular or LEO satellite networks; and
   sharing the pin annotation with the one or more other vehicles of the group of vehicles via the secure network.

7. The communication system of claim 1, wherein the controller is further configured to:
   receive at least one of a voice recording annotation and a camera recording annotation at a particular set of global positioning system (GPS) coordinates;
   upload the at least one of the voice recording annotation and the camera recording annotation to a secure network via the cellular or LEO satellite networks; and
   sharing the at least one of the voice recording annotation and the camera recording annotation with the one or more other vehicles of the group of vehicles via the secure network.

8. The communication system of claim 1, wherein information shared amongst the group of vehicles via the LEO satellite network comprises voice recordings and camera recordings of instructions for navigating an off-road obstacle; and
   wherein the voice and camera recordings are uploaded to a secure server and associated with a particular GPS location to be subsequently retrieved and viewed/listened to by other vehicles with access to the secure server to help them navigate the off-road obstacle at that particular GPS location.

9. The communication system of claim 1, wherein the controller is further configured to:
   determine a current set of suspension settings of the vehicle; and
   in response to detecting that the vehicle is opted-in to share its current set of suspension settings:
      upload the current set of suspension settings for the vehicle to a secure network via the cellular or LEO satellite networks, and
      sharing the current set of suspension settings of the vehicle with the one or more other vehicles of the group of vehicles via the secure network.

10. The communication system of claim 1, wherein the vehicle further includes a touchscreen display with a user interface, and wherein the controller is further configured to:
    display, on the user interface, a group area where icons for each vehicle of the group of vehicles are shown;
    display, on the user interface, a map area where a group leader vehicle is shown relative to the other vehicles of the group; and
    provide directional instructions to the other vehicles of the group for following the leader vehicle from their current location.

11. A method of controlling communication amongst a group of vehicles, the method comprising:
    determining, by a controller of a vehicle of the group of vehicles, whether a cellular network is unavailable or a user input indicative of a switchover request has been received,
    wherein the vehicle comprises both a cellular network transceiver configured to communicate via the cellular network and a low Earth orbit (LEO) satellite network transceiver configured to communicate via an LEO satellite network;
    when the cellular network is available, controlling, by the controller, the cellular network transceiver to share information between the vehicle and one or more other vehicles of the group of vehicles via the cellular network;
    when the cellular network is unavailable or in response to receiving the user input indicative of the switchover request, controlling, by the controller, the LEO satellite network transceiver to share information between the vehicle and the one or more other vehicles of the group of vehicles via the LEO satellite network and not via the cellular network;
    displaying, on a user interface of the vehicles, a group area where icons for each vehicle of the group of vehicles are shown;
    displaying, on the user interface, a map area where a group leader vehicle is shown relative to the other vehicles of the group; and
    providing, by the controller, directional instructions to the other vehicles of the group for following the leader vehicle from their current location.

12. The method of claim 11, further comprising:
    detecting, by the controller, the user input indicative of the switchover request; and
    only in response to detecting the user input, controlling, by the controller, the LEO satellite network transceiver to share information between the vehicle and the one or more other vehicles of the group of vehicles via the LEO satellite network and not via the cellular network.

13. The method of claim 11, further comprising:
    detecting, by the controller, a dropout condition of the cellular network; and
    only in response to detecting the dropout condition, controlling, by the controller, the LEO satellite network transceiver to share information between the vehicle and the one or more other vehicles of the group of vehicles via the LEO satellite network and not via the cellular network.

14. The method of claim 11, further comprising establishing, by the controller, a leader mode where a particular vehicle of the group of vehicles opts-in to be a leader vehicle, wherein the information shared amongst the group of vehicles is leader information relative to the leader vehicle.

15. The method of claim 14, wherein the leader information comprises global positioning system (GPS) coordinate based information for each particular vehicle of the group of vehicles relative to the leader vehicle.

16. The method of claim 11, further comprising:
receiving, by the controller, a pin annotation identifying a point-of-interest (POI) at a particular set of global positioning system (GPS) coordinates;
uploading, by the controller, the pin annotation to a secure network via the cellular or LEO satellite networks; and
sharing, by the controller, the pin annotation with the one or more other vehicles of the group of vehicles via the secure network.

17. The method of claim 11, further comprising:
receiving, by the controller, at least one of a voice recording annotation and a camera recording annotation at a particular set of global positioning system (GPS) coordinates;
uploading, by the controller, the at least one of the voice recording annotation and the camera recording annotation to a secure network via the cellular or LEO satellite networks; and
sharing, by the controller, the at least one of the voice recording annotation and the camera recording annotation with the one or more other vehicles of the group of vehicles via the secure network.

18. The method of claim 11, wherein the information shared amongst the group of vehicles via the LEO satellite network comprises voice recordings and camera recordings of instructions for navigating an off-road obstacle at a particular GPS location; and
uploading, by the controller, the voice and camera recordings to a secure server to be subsequently retrieved and viewed/listened to by other vehicles with access to the secure server to help them navigate the off-road obstacle at that particular GPS location.

19. The method of claim 18, further comprising:
determining, by the controller, a current set of suspension settings of the vehicle; and
in response to detecting that the vehicle is opted-in to share its current set of suspension settings:
uploading, by the controller, the current set of suspension settings for the vehicle to the secure network via the cellular or LEO satellite networks, and
sharing, by the controller, the current set of suspension settings of the vehicle with the one or more other vehicles of the group of vehicles via the secure network.

20. The method of claim 19, further comprising:
detecting, by the controller, when one vehicle of the group of vehicles shares a current set of suspension settings via the cellular and/or LEO satellite networks; and
in response to detecting a user input indicative of a request to copy the suspension settings, controlling, by the controller, suspension settings of the vehicle to copy the shared current set of suspension settings of the one vehicle of the group of vehicles.

* * * * *